US009319458B2

(12) United States Patent
Watson et al.

(10) Patent No.: US 9,319,458 B2
(45) Date of Patent: Apr. 19, 2016

(54) SITE-BASED SERVER SELECTION (71) Applicant: Netflix, Inc., Los Gatos, CA (US)

(72) Inventors: Mark Watson, San Francisco, CA (US); Wei Wei, Fremont, CA (US)

(73) Assignee: Netflix, Inc., Los Gatos, CA (US)

( * ) Notice: Subject to any disclaimer, the term of this patent is extended or adjusted under 35 U.S.C. 154(b) by 229 days.

(21) Appl. No.: 13/735,827

(22) Filed: Jan. 7, 2013

(65) Prior Publication Data
US 2014/0195646 A1 Jul. 10, 2014

(51) Int. Cl.
*G06F 15/16* (2006.01)
*H04L 29/08* (2006.01)
*H04L 29/06* (2006.01)

(52) U.S. Cl.
CPC ........ *H04L 67/1002* (2013.01); *H04L 65/4092* (2013.01); *H04L 65/604* (2013.01); *H04L 65/80* (2013.01)

(58) Field of Classification Search
CPC ...................................................... H04L 29/06
USPC .................. 709/217, 218, 219, 223, 224, 248
See application file for complete search history.

(56) References Cited

U.S. PATENT DOCUMENTS

| | | | |
|---|---|---|---|
| 6,477,522 B1* | 11/2002 | Young | |
| 7,652,990 B2* | 1/2010 | Bryson | 370/230 |
| 7,698,460 B2* | 4/2010 | Zhang et al. | 709/238 |
| 2002/0065922 A1* | 5/2002 | Shastri | 709/227 |
| 2005/0105533 A1* | 5/2005 | Malolepsy et al. | 370/395.41 |
| 2008/0189429 A1 | 8/2008 | Dacosta | |
| 2012/0124177 A1* | 5/2012 | Sparks | 709/219 |
| 2012/0304234 A1* | 11/2012 | Carbunar et al. | 725/93 |
| 2013/0223240 A1* | 8/2013 | Hayes et al. | 370/252 |

OTHER PUBLICATIONS

European Patent Office, "Search Report" in application No. PCTUS2014/010374, dated Apr. 2, 2014, 9 pages.
European Current Claims in application No. PCTUS2014/010374, dated Apr. 2014, 6 pages.
Heinz et al., "Toward Kernel Density Estimation Over Streaming Data", Department of Mathematics and Computer Science University of Marbug Germany, International Conference on Management of Data COMAD 2006, Delhi, India, Dec. 14-16, 2006, Computer Society of India, 2006, 12 pages.

* cited by examiner

*Primary Examiner* — Liangche A Wang
*Assistant Examiner* — Kaylee Huang
(74) *Attorney, Agent, or Firm* — Hickman Palermo Becker Bingham LLP (57) ABSTRACT In an embodiment, a method comprises receiving a first data streamed from a first server computer at a first site; collecting a first throughput data for the first site based, at least in part, on a first throughput of the first data streamed from the first server computer; receiving a second data streamed from a second server computer at a second site; collecting a second throughput data for the second site based, at least in part, on a second throughput of the second data streamed from the second server computer; switching from the second server computer at the second site, to a third server computer at the first site, based, at least in part, on a comparison between the first throughput data and the second throughput data; wherein the method is performed by one or more special-purpose computing devices.

21 Claims, 6 Drawing Sheets

SITE-BASED SERVER SELECTION

TECHNICAL FIELD

The present disclosure generally relates to data communication networks. The present disclosure relates more specifically to techniques for streaming delivery of digital media based on performance data from a plurality of sites.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Typically, before a client computer begins downloading digital media from a server computer, clients are initially provided with a list of one or more uniform resource locators ("URLs") for one or more files that have been encoded for delivery using different bitrates. In the list, clients are typically provided with multiple URLs for each bitrate file available. A bitrate file contains encoded media content. A URL may point to one or more servers on a network, e.g., a single server computer at a data center or a content delivery network ("CDN").

For example, a client may receive a first URL and a second URL for a particular bitrate file, e.g., the movie "Tarzan" encoded in H.264 format with a bitrate of 1080 (referred to hereinafter as the "Tarzan 1080 bitrate file"). The first URL may point to a copy of the Tarzan 1080 bitrate file, located on a single server. The second URL may point to a copy of the Tarzan 1080 bitrate file, located on a CDN. The client may receive metadata regarding the URLs. For example, the first URL may have a first preference and a first weight, such that the first preference and the first weight are each larger than a second preference and a second weight, which are associated with the second URL. A tag may be associated with each URL, such that the first tag may indicate that the first URL points to a bitrate file located on a single server, and the second tag may indicate that the second URL points to a bitrate file located on a CDN.

After receiving the list of one or more URLs, when the streaming session starts, the client first selects a URL that it wishes to download from first and then tests each URL, in order by preference, until the client finds a URL that provides the bitrate file with a minimum throughput threshold. If none of the URLs meet the minimum throughput threshold, the client compares each URL's weighted throughput, according to the weight associated with each URL, respectively, and the client continues to use the URL with the best weighted throughput. Thus, the weight associated with each URL is a secondary factor used to choose a URL. The weighting assigned to each URL is used to predictably distribute the load between the servers that the URLs each point to, respectively.

The method above has several disadvantages. For example, the throughput of a particular URL largely depends upon the network path between a client and a server; however, no optimization is performed based on the location of the client and a plurality of servers located similarly in a network topology. Also, the client measures throughput of the available URLs when a streaming session starts; thus, the client cannot choose which URL to use based on historical throughput data. Furthermore, some URLs may only be intended to be used as a last resort failover, but since no rules prevent a client from switching to another URL to optimize throughput, a client may use a URL regardless of the intended use of the URL. Further still, all bitrates must be stored on all servers to ensure that throughput measurements made with one bitrate file accurately predict the throughput that would be achieved with a different bitrate file.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Network Topology
   2.1 Sites
   2.2 Overview of Example Network
   2.3 Overview of Example Site-Based URL Selection Processes
   2.4 Levels
   2.5 Overview of Example Site-Based and Level-Based URL Selection Process
3.0 Collecting Historical Data
   3.1 Site-Based Historical Data
4.0 Estimating Throughput Based on Historical Data
   4.1 Historical Average
   4.2 Exponential Smoothing—An Adaptive Method
   4.3 Kernel Density Estimator ("KDE")
      4.3.1 M-Kernel Implementation
      4.3.2 Optimized M-Kernel Implementation
      4.3.3 Modified KDES for Evolving Data
   4.4 Overview of Example Site-Based and Estimated Throughput-Based URL Selection Process
   4.5 Servers with Priority-Based Bitrate Files
   4.6 Probing
5.0 Implementation Mechanisms—Hardware Overview
6.0 Other Aspects of Disclosure
1.0 General Overview In an embodiment, a method comprises receiving a first data streamed from a first server at a first site; collecting a first throughput data for the first site based, at least in part, on a first throughput of the first data streamed from the first server;

receiving a second data streamed from a second server at a second site; collecting a second throughput data for the second site based, at least in part, on a second throughput of the second data streamed from the second server; switching from the second server at the second site, to a third server at the first site, based, at least in part, on a comparison between the first throughput data and the second throughput data; wherein the method is performed by one or more special-purpose computing devices.

Some embodiments may provide an efficient method for a client to accurately determine the perceived throughput of a server based, at least in part, on the site at which the server is located. In one embodiment, a method comprises choosing a particular server, located at a particular site, based, at least in part, on the historical throughput received from one or more other servers located at the same site. Furthermore, the client is restricted from requesting to download bitrate files from servers located at particular sites except in cases of failover or unavailability of other servers.

In some embodiments, data mining techniques, such as kernel density estimation, may improve the accuracy of the estimated throughput for one or more servers at a site. Optimized kernels may be presented to estimate throughput in real-time. As a byproduct of the method presented, servers may selectively store popular media on particular servers, which may be high-throughput or low-cost servers. Embodiments are useful, for example, in networked computer systems that deliver movies, TV shows, or other audiovisual media by streaming data communications.

2.0 Network Topology

The data throughput between a client computer and a server computer over networks may be based on many factors, such as the number of networks traversed, the bandwidth of any network traversed, the congestion of any network traversed, the client's performance, and the server's performance.

To reduce latency and avert networks becoming overloaded with congestion, servers may be located within ISP networks, peering links, and transit networks. In some cases, maintaining servers within ISP networks, peering links, and transit networks may be costly, or have a limited bandwidth.

2.1 Sites

The throughput between a client and a first server may be similar to the throughput between the client and a second server, if the first and second servers are located on the same site. If the first and the second servers are located at the same site, the first and second servers may be located in the same location in the network topology. Accordingly, data downloaded by the client from the first server may traverse the same networks and follow the same path as data downloaded by the client from the second server since the locations of the servers with respect to the client are nearly, if not exactly, identical. For convenience of expression, when two servers are described as being at the same site, the servers are located so closely in the network topology that the difference between the locations of the servers is negligible. For example, a first server may be located in a first building, and a second server may be located in a second building that is across the street, with similarly placed nodes in the network topology.

A CDN may be considered a single site. Although all the servers at a CDN may be geographically diverse, all the servers of a CDN are expected to perform similarly for any given client. Furthermore, a link to a bitrate file on a CDN may be forwarded to any number of servers in any number of locations, but the CDN will be treated as if it is a single server at a single location. Thus, in some embodiments or examples, when referring to a server, the server may be an entire CDN in which all the servers have similar performance, or throughput.

Two servers may be determined to be in the same site automatically, based on any number of factors, including, but in no way limited to, the Internet protocol addresses of the servers, the mailing address of the two server computers, the physical distance between the servers, a shared access point between the servers, or any combination of factors. Furthermore, in some cases two servers may be manually designated as sharing the same site based on tests or particular knowledge about the network topology, performance, or throughput of two servers.

Servers that are designated to be in the same site are expected to have similar throughput. For example, two servers may share the same room, but if the first server accesses memory at half the rate the second server accesses memory, then in many embodiments the first server's throughput would much worse than the second server. Accordingly, the first and second servers should be designated in different sites, regardless of the servers' physical proximity.

2.2 Overview of Example Network

Figure 1:
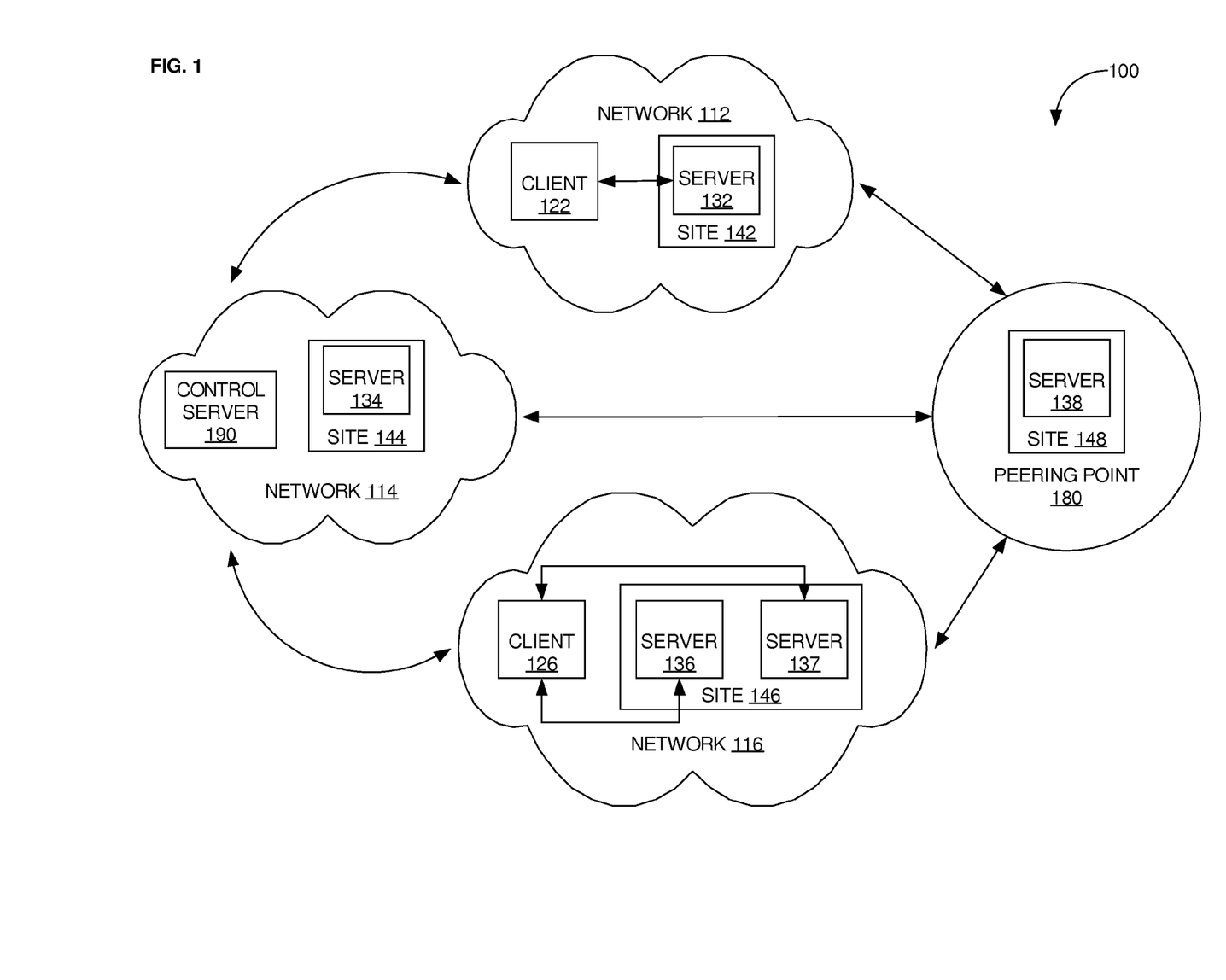
FIG. 1 illustrates interconnected networks, according to an embodiment.

FIG. 1 is a block diagram that illustrates four networks all interconnected over another network, according to an embodiment. While FIG. 1 illustrates one embodiment for purposes of illustrating a clear example, other embodiments may omit, add to, reorder, and/or modify any of the elements shown.

In the embodiment illustrated in FIG. 1, network 100 includes network 112, network 114, and network 116 (collectively referred to as "networks 110"); client 122 and client 126 (collectively referred to as "clients 120"); server 132, server 134, server 136, server 137, and server 138 (collectively referred to as "servers 130"); site 142, site 144, site 146, and site 148 (collectively referred to as "sites 140"); peering point 180; and control server 190. The term "server" may refer to a server computer comprising one or more cores, processors, computers, or clusters.

Network 112 includes client 122 and server 132. Network 112 is communicatively coupled with network 114 and peering point 180. Network 112 is also communicatively coupled to network 116, through network 114 and peering point 180. Network 114 includes server 134. Network 114 is communicatively coupled with network 112, network 116, and peering point 180. Network 116 includes client 126, server 136, and server 137. Network 116 is communicatively coupled with network 114 and peering point 180. Network 116 is also communicatively coupled to network 112, through network 114 and peering point 180.

Clients 120 are client computing devices with respect to the servers. For example, clients 120 may be desktop computers, laptops, tablets, phones, other mobile devices, game consoles, set-top boxes, streaming media players, disc players, televisions or any other computing device capable of streaming media content from a server and playing it for a user.

Client 122 is communicatively coupled with server 132 through network 112. Client 122 is communicatively coupled to server 134 through network 112 and network 114. Client 122 is communicatively coupled to server 136 and server 137 through networks 110, or through network 112, peering point 180, and network 116. Client 122 is communicatively coupled to server 138 through network 112 and peering point 180. Client 122 is also communicatively coupled to control server 190.

Client 126 is communicatively coupled with server 136 and server 137 through within network 116. Client 126 is communicatively coupled to server 134 through network 116 and network 114. Client 126 is communicatively coupled to server 132 through networks 110, or through network 116, peering point 180, and network 112. Client 126 is communicatively coupled to server 138 through network 116 and peering point 180. Client 126 is also communicatively coupled to control server 190.

Servers 130 are computing devices that serve bitrate files or portions of bitrate files to one or more clients of Clients 120. Each of servers 130 may be a computer at a data center, a server network provided by a CDN, or any other computing device capable of serving bitrate file, or portions of bitrate files.

Server 132 is at site 142. Server 134 is at site 144. Server 136 and server 137 are at site 146. Server 138 is at site 148. In the embodiment illustrated in FIG. 1, server 136 and server 137 are both at site 146, but in some embodiments servers in the same network may be at different sites.

Peering point 180 is a peering point capable of reducing latency and increasing throughput between the elements contained in networks 110. Peering point 180 may include server 138 and may include one or more routers, switches, or other internetworking infrastructure elements.

Control server 190 is a computer that provides URL lists to clients. In FIG. 1, control server 190 is communicatively coupled to clients 120 and servers 130, through networks 110 and peering point 180. Furthermore, control server 190 may store or have access to data representing the states, capacity, or other properties of clients 120 and servers 130. Control server 190 may be contacted by any one of clients 120 at the beginning of a session. Alternatively, control server 190 may regulate clients 120 and may regulate the behavior of clients 120 throughout a session, e.g., when a user begins watching or listening to a particular bitrate file and when a user stops watching or listening to the particular media.

2.3 Overview of Example Site-Based URL Selection Process

Figure 2:
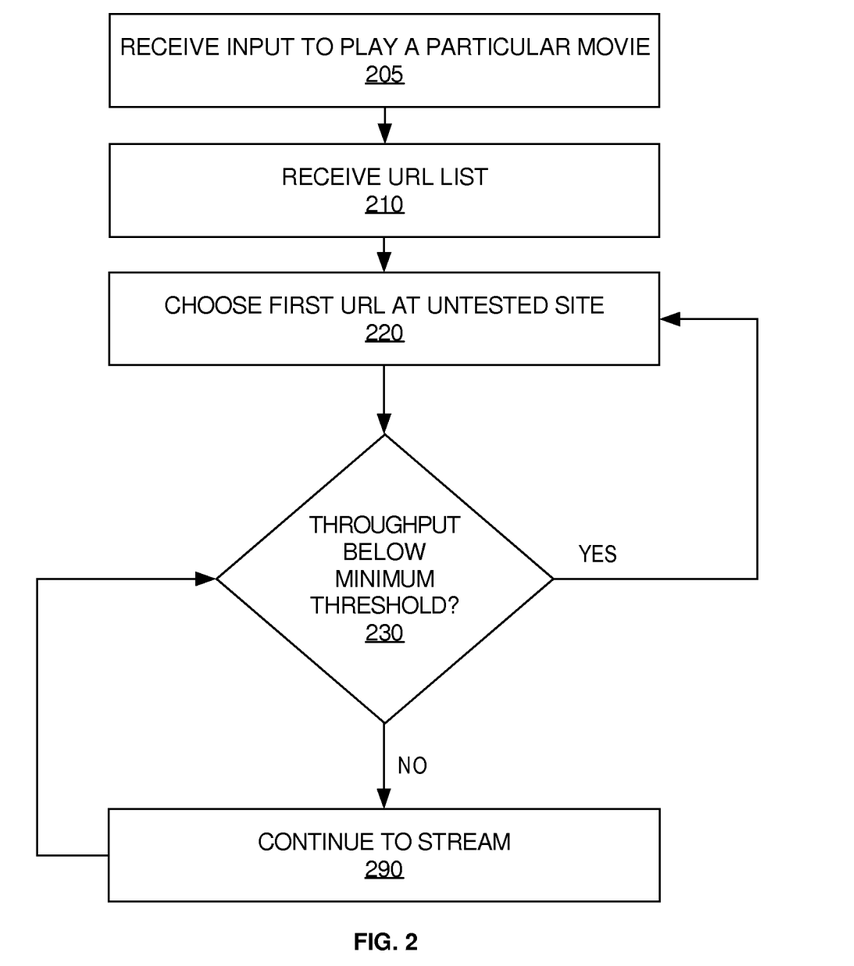
FIG. 2 illustrates an example site-based process to determine which servers to download a bitrate file from, according to one embodiment.

FIG. 2 illustrates an example site-based process to determine which servers to download a bitrate file from, according to one embodiment. While FIG. 2 illustrates example steps according to an embodiment, other embodiments may omit, add to, reorder, and/or modify any of the steps shown. For purposes of illustrating a clear example, FIG. 2 may be described with reference to FIG. 1, but using the particular arrangement of FIG. 1 is not required in other embodiments.

At step 205, input to play a particular movie is received. For example, client 122 receives input to play a particular movie. In step 210, a URL list is received. For example, client 122 queries control server 190 for servers 130 that have bitrate files for the particular movie. Control server 190 returns a URL list, in which each URL points to a particular bitrate file on one of servers 130. Each URL also includes metadata that may include the bitrate of each bitrate file, the preference value of each server, and the site each server is located at.

In step 220, a first URL at an untested site is chosen. For example, client 122 chooses the first URL to download a bitrate file based, at least in part, on the initial bitrate client 122 has determined it should attempt to download first, and the preference associated with each server that has the bitrate file, with the initial bitrate, available. Client 122 may determine the initial bitrate based any number of factors such as client 122's device characteristics such as resolution and performance, available bitrates, and preferences and weights assigned to the URLs. After selecting the first URL, client 122 begins downloading the bitrate file from server 136, which the first URL points to. The client 122 may buffer the downloaded content.

In step 230, the process tests whether throughput is below a minimum threshold; if so, then control returns to step 220, and if not, control transitions to step 290. For example, client 122 determines that the throughput received from server 136, at site 146, is below a particular minimum threshold. Accordingly, client 122 proceeds to step 220. The minimum threshold may be a predetermined value, or may be based on any number of factors such as the long term average bitrate of the bitrate file client 122 is attempting to download, the actual encoded data size of the portions of the bitrate file that the client 122 has attempted, or will attempt, to download, the size of the buffer on client 122, or how full the buffer on client 122 is.

In step 220, continuing with an example, client 122 determines that the second URL points to server 137, which is also at site 146; however, client 122 will not attempt to download a bitrate file from the second URL because site 146 has already been tested, by downloading the bitrate file from server 136, and the throughput was determined to be insufficient. Thus, client 122 assumes that server 137 will provide the same inadequate throughput. Accordingly, client 122 will select the third URL in the URL list, e.g., server 132, which in this case is located at a different untested site. Client 122 switches to server 132 and proceeds to revisit step 230.

In revisited step 230, client 122 determines that the throughput received from server 132 is not below the minimum threshold. Thus, client 122 proceeds to step 290.

In step 290, streaming continues. For example, client 122 continues to download the bitrate file from the current URL. Client 122, based on any number of factors including, but in no way limited to, a time interval, the size of the buffer on client 122, or how full the buffer on client 122 is, may return to step 230 to verify that that the current site is still delivering a throughput equal to or greater than the minimum threshold.

2.4 Levels

To reduce the load of costly or limited strategic servers, clients may be restricted from using specified servers or sites, unless certain conditions are met such as availability or failover. For example, a client may be restricted from requesting a bitrate file based, at least in part, on whether there are less costly servers with the desired bitrate file. Cost may not always be function of money; in some embodiments, cost is computed using bandwidth, storage space, throughput, or any number of factors that may contribute to expenses or performance. A client may also be restricted from requesting a bitrate file based, at least in part, on whether there are non-strategic servers from which the client may stream with a minimum throughput. Furthermore, in another example, a client may be restricted from requesting a bitrate file based, at least in part, on whether there are non-strategic servers that are not overloaded.

In an embodiment, sites are associated with abstractions termed levels that are identified using level values. A client may request a bitrate file from a first-level site. However, a client may request a bitrate file from a second-level site, based on one or more factors including the availability of a selected bitrate file on the first-level sites, the actual or estimated throughput of the first-level sites, or the failure of the first-level sites. Furthermore, a client may request a bitrate file from a second-level site, based on any combination of factors including the factors previously enumerated. A client may also switch freely between sites in the same level for any combination of factors including probing, discussed below.

Other embodiments may include more than two levels. Similarly, those embodiments may impose restrictions on switching levels for many reasons, or combination of reasons, including, but in no way limited to the reasons already enumerated above.

The same sites may be associated with different levels for different clients. Since clients may be located anywhere in the network topology, particular sites may deliver content more cheaply to some clients than other clients. Accordingly, the sites may be dynamically associated with levels based on the particular client, the location of the client, the client device, the type of client, or many other factors.

Sites may be statically associated with particular levels for all clients or for a particular set of clients. Other sites, however, may be dynamically associated with particular levels based on the location of a particular client.

Figure 3:
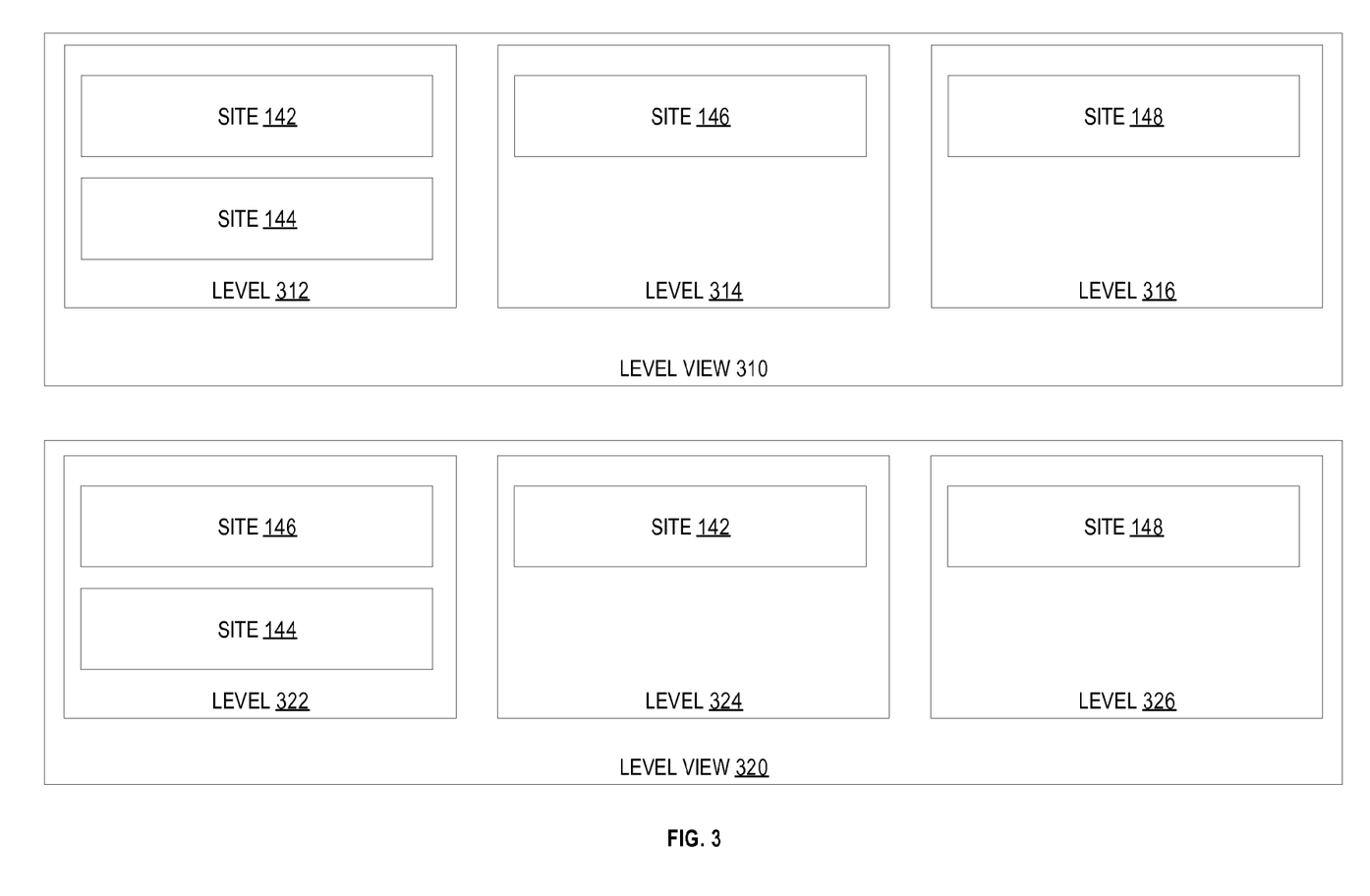
FIG. 3 illustrates sites associated with level views for two clients, respectively, according to an embodiment.

FIG. 3 illustrates sites associated with level views for two clients, respectively, according to an embodiment. While FIG. 3 illustrates an embodiment with two clients, other embodiments may omit, add to, reorder, and/or modify any of the elements shown.

In the embodiment illustrated in FIG. 3, using the embodiment illustrated in FIG. 1 as an example, level view 310 and level view 320 illustrate different level assignments for client 122 and client 126, respectively. Level view 310 includes level 312, level 314, and level 316. Level view 320 includes level 322, level 324, and level 326. In an embodiment, level views may comprise more or less than three levels and may have any number of sites assigned to the levels. In an embodiment, any number of sites may be assigned to a level.

Site 142 and site 144 are assigned to level 312, which is a first level for client 122, based, at least in part, on site 142 and site 144 having the shortest paths to client 122. Similarly, site 146 and site 144 are assigned to level 322, which is a first level for client 126, based, on the same factors.

Site 146 is assigned to level 314, which is a second level for client 122, based at least in part, on site 146 having a greater distance to client 122. Similarly, site 142 is assigned to level 324, which is a second level for client 126, based at least in part on the same factors.

Site 148 is assigned to level 316, which is a third level for client 122, based at least in part on site 148 being located at peering point 180. While the topology between client 122 and site 148 may indicate that there is shorter distance between site 148 and client 122, compared to site 146 and client 122, site 148 may be more expensive to maintain and thus reserved for client requests when there is no other alternative. Accordingly, site 148 in the embodiment illustrated in FIG. 3 may be statically designated as a third level site for all clients 120. Similarly, site 148 is assigned to level 326, which is a third level for client 126, based at least in part, on the same factors.

In an embodiment, a client autonomously adheres to the rules of switching between servers or sites within levels and switching between levels. Alternatively, a server may manage a client, wherein the client is instructed by the server which servers or sites the client is allowed to download data from.

2.5 Overview of Example Site-Based and Level-Based URL Selection Process

Figure 4:
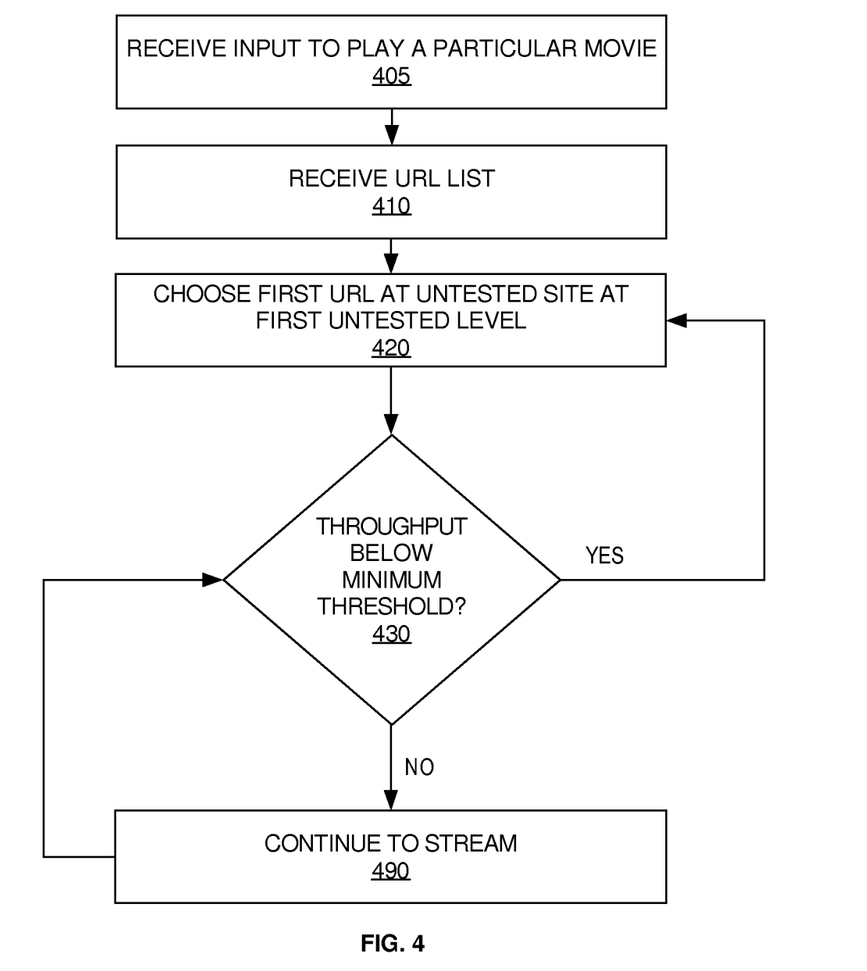
FIG. 4 illustrates an example site-based and level-based process to determine which servers to download a bitrate file from, according to one embodiment.

FIG. 4 illustrates an example site-based and level-based process to determine which servers to download a bitrate file from, according to one embodiment. While FIG. 4 illustrates example steps according to an embodiment, other embodiments may omit, add to, reorder, and/or modify any of the steps shown.

For purposes of illustrating a clear example, FIG. 4 may be described using the embodiments illustrated in FIG. 1 and FIG. 3. However, other embodiments may use other arrangements of clients, servers, infrastructure, and levels. Referring now to FIG. 4, in step 405, input to play a particular movie is received. For example, client 122 receives input to play a particular movie, as previously discussed in step 205. In step 410, a URL list is received. For example, client 122 receives a URL list, as previously discussed in step 210. However, the URL list returned in step 410 also includes in the metadata the level each site is assigned to for client 122, according to the level view 310.

In step 420, the process chooses a first URL at an untested site at a first untested level. For example, client 122 chooses the first URL to download based, at least in part, on 1) the initial bitrate client 122 has determined it should attempt to download first, 2) the preference associated with each URL that points to a bitrate file with the initial bitrate, and 3) the sites assigned to level 312. Accordingly, in step 420, client 122 begins downloading the bitrate file from server 132, located at site 142, assigned to site 142, which is assigned to the first level 312 for client 122. Unlike step 220, client 122 is not allowed to download the bitrate file from server 136, located at site 146, because site 146 is assigned to second level 314, as long as there is an available bitrate file stored on a server at first level 312 for client 122. Availability may be based on whether a URL for the bitrate file was included in the list of URLs, or based on whether the server that the URL points to is performing properly.

In step 430, the process tests whether throughput is below a minimum threshold; if so, then control transitions back to step 420, and otherwise control transfers to step 490. For example, client 122 determines that the throughput being received from server 132 at site 142 is below the minimum threshold. Accordingly, client 122 proceeds to step 420.

In step 420, client 122 chooses another URL based on the same factors as discussed originally in step 430. Since a copy of the bitrate file is not stored on server 134, client 122 is allowed to download the bitrate file from server 136, since server 136 is located at site 146, which is assigned to second level 314. Client 122 proceeds to revisit step 430.

In revisited step 430, client 122 determines that the throughput from server 136, located at site 146, is not below the minimum threshold. Accordingly, client 122 proceeds to step 490. In step 490, client 122 continues to download the bitrate file from server 136, at site 146.

3.0 Collecting Historical Data

Historical data may be a collection of throughput data for streaming data transfers that occurred in the past. Throughput may be the amount of data received by a client from a server in a particular amount of time. For example, a client may request a two-second chunk of a particular bitrate file from a server. The throughput may be the size of the requested two-second chunk divided by the number of seconds it took to receive the requested two-second chunk. The throughput data is then stored as a sample point in the historical data.

Storing historical data associated with a server may be inefficient. For example, based, at least in part, on the historical data a client has collected, a client may determine what the starting bitrate should be and which server to request a bitrate file from. Using the embodiment illustrated in FIG. 1 as an example, client 122 may receive a URL list that includes URLs for server 136 and server 138 for bitrate files. Client 122 may request a two-second chunk of a bitrate file from server 136 and store the number of seconds it took the client to receive the two-second chunk. Client 122 may then begin downloading a two-second chunk from server 138 and storing the observed throughput. Subsequently, client 122 may be given a new URL list for a new bitrate file, which includes server 137 and server 138, but not server 136. If the historical data is merely associated with a particular server, then client 122 cannot estimate the throughput for server 137 even though server 136 and server 137 are at the same site. Furthermore, client 122 may not determine a starting bitrate based on the historical data stored associated with server 138, because there is no historical data associated with server 137. Unfortunately, client 122 may also attempt to download a bitrate file from the server 137 even if the historical data associated with server 136 shows that server 136, which is located at the same site as server 137, has a much lower throughput than server 138. This problem is exacerbated when there is a large pool of servers and the client is provided with different servers in each URL list. In this disclosure, historical throughput data that is merely associated with a particular server is termed server-based historical data.

3.1 Site-Based Historical Data

Site-based historical data includes the amount of data received by a client from a server in a particular amount of time. The historical data is, however, associated with the site at which the server is located, rather than the server alone. A client may use site-based historical data to accurately estimate the throughput of other servers not yet used by the client. Furthermore, the client may reduce its memory usage and compute a more accurate estimate sooner by collecting site-based historical data; in a site-based implementation, if the estimation model requires a certain number of data points, the client merely needs one set with the required number of data points.

The client may use site-based historical data to accurately estimate the throughput of other servers not yet used by the client. Site-based historical data is a collection of throughput data for the entire site. Even though throughput data may not have been received from each server at a particular site, the client may use site-based historical data for all the servers at the particular site, given that all servers at a site are expected to have similar throughput.

The client may compute a more accurate estimate sooner by collecting site-based historical data. In a site-based implementation, estimation may converge faster because all of the historical data for the site may be included in the same dataset. In contrast, in a server-based implementation each server within the same site must still provide enough throughput data to give a relevant or useful estimate. Furthermore, any changes in throughput of the site will be reflected in the estimate sooner, since the entire throughput data is being stored in the same historical dataset.

An embodiment in which a client site-based historical data may be described using the embodiment illustrated in FIG. 1, client 122 may be given a URL list, which includes URLs for server 136 and server 138, for one or more bitrate files on each server. Client 122 may request a two-second chunk of a bitrate file from server 136 and store the number of seconds it took the client to receive the two-second chunk, based on the size of the two-second chunk. Client 122 may then download a two-second chunk from server 138 and store the observed throughput. Subsequently, client 122 may be given a new URL list for a new set of bitrate files, which includes server 137 and server 138, but not server 136. If the historical data is site-based, then client 122 can correctly estimate the throughput for server 137 since server 136 and server 137 should have a similar performance. Accordingly, client 122 may determine the starting bitrate based on the historical data stored and associated with both site 146 and site 148. Furthermore, client 122 may also not attempt to download the new bitrate file, or a portion of the new bitrate file, from the server 137 even if the historical data associated with site 146 shows that site 146, which server 137 belongs to, has a much lower throughput than site 148 which server 138 belongs to. The benefits of this solution are amplified when the number of servers located at each site increases.

4.0 Estimating Throughput Based on Historical Data

Incorrectly estimating the throughput can decrease the quality of the user's experience. For example, if a client is estimates based, at least in part, on historical data that the starting bitrate is lower than the actual available throughput, then the user will be shown a video that is, at least initially, lower quality. If, however, the client estimates that the starting bitrate is higher than the actual available throughput, then the client, at least initially, will take a long time to buffer sufficient data to start playback.

Unfortunately, throughput data may be noisy, meaning individual samples of throughput may be larger or smaller than normally perceived, and multiple factors may determine the throughput between a client and a server, and any number of conditions may temporarily or permanently alter the throughput.

In an embodiment, statistical methods may be used to reduce noise and more accurately estimate throughput. In an embodiment a moving average may be used to estimate the throughput. Other embodiments may implement other methods of estimating throughput, such as interpolators, kernels, or smoothing functions. In the following sections, throughput data is treated as a data stream consisting of an unbounded sequence of real numbers greater than zero. For example, if a client receives a chunk of data that is one megabit, in 0.5 seconds, then the throughput may be represented as a two, which is shorthand for two megabits per second. Each measured throughput data observed may be treated as a new data point in the stream.

4.1 Historical Average

In an embodiment an historical average is used to estimate throughput. A historical average may use little memory and can be computed in O(1), constant time. The historical average takes as a parameter the newest incoming data point in the stream, $x_n$, and the previous historical average, $H_{n-1}$, where n is the number of samples in the stream so far:

$$H_n(x_n, H_{n-1}) = \frac{n-1}{n} H_{n-1} + \frac{1}{n} x_n.$$

4.2 Exponential Smoothing—an Adaptive Method

Characteristics of a data stream can vary over time. For example, a mobile client device may download a particular bitrate file from one network and then download another bitrate file from another network. As a specific example, assume a user first watches a movie on a phone connected to a wireless router, and subsequently watches another movie on the same phone while connected to a cellular network. In such cases, it may be preferable to give the most recent throughput data more weight since the bandwidth observed from one site may be vary widely based on which internet service provider is being used.

Accordingly, in an embodiment an exponential function may be used to estimate throughput; the function uses little memory and can be computed in O(1) constant time. The exponential function takes as parameters the newest incoming data point in the stream, $x_n$, an alpha parameter $\alpha$, and the previous result from the exponential function, $E_{n-1}$:

$$E_n(\alpha, x_n) = (\alpha) x_n + (1-\alpha) E_{n-1}.$$

In the exponential smoothing function above, a is a number between zero and one, such that the greater $\alpha$ has more weight given to the most recent samples. Using exponential smoothing the client may more accurately estimate an evolving stream that changes gradually over time, or changes abruptly, based on the α parameter.

Thus, in the example with the mobile client, the estimated throughput may adapt to the client's changes its position in the network topology. Furthermore, α may also be a function that changes based on the gradient or Laplacian of the sample stream or the output of the exponential function.

4.3 Kernel Density Estimator ("KDE")

In an embodiment data mining techniques such as kernel density estimation may be used to improve the accuracy of the estimated throughput. Accordingly, historical data may be represented as a probability density function ("PDF"), and each new data point in the stream may also be represented as a new PDF, instead of merely a discrete data point in a stream.

Alternatively estimations based on histogram analysis could be used; however, using histogram-based analysis may require more memory in some embodiments, and may also require more than one pass over the data. For example, as common preprocessing step to computing a histogram an initial pass over the entire data is performed to determine the span of the domain. Furthermore, some histogram-based methods use, as another preprocessing step, a determination regarding the size of each bucket in the histogram, which often requires one or more passes over the data set.

A kernel density estimator ("KDE") is a non-parametric function that estimates the PDF of a random variable. Kernel density estimation is a data smoothing solution where inferences about a population are based on a finite data sample. In particular, KDEs strictly rely on the samples without prior knowledge of the actual underlying distribution. Furthermore, a KDE becomes more accurate as the number of samples increases.

A PDF is a function that describes the likelihood that a random variable has a particular value. The probability for the random variable to fall within a particular region is given by the integral of the random variable's density over the region. A PDF is nonnegative everywhere, and its integral over the entire domain is equal to one. For example, in a normal distribution, there is a 50% chance that a random variable will be less than or equal to zero, because 50% of the area under a normal distribution is between negative infinity and zero, inclusively.

In an embodiment, a KDE with kernel function K, bandwidth h, over n samples may be defined as:

$$f^{(n)}(x) = \frac{1}{n \cdot h^{(n)}} \sum_{i=1}^{n} K\left(\frac{x - X_i}{h^{(n)}}\right).$$

In the KDE above, h may be any number greater than zero, but may be particularly tuned based on any number of factors including kernel K. Alternatively, as discussed below, h may be a function parameterized by the data stream. K may be any kernel, for example, K may be a Gaussian kernel, uniform kernel, or Epanechnikov kernel, however from a practical point of view it is computationally advantageous to choose a bounded kernel, e.g., the Epanechnikov kernel, triweight kernel, or cosine kernel, although it is not required that the range of the kernel be nonnegative in all instances.

While using a KDE is advantageous in many ways, some of which are enumerated above, as the number of samples, n, grows the more expensive it is to store the data stream and compute a KDE. Specifically, the space required to store the data stream and the computational cost of a KDE grows linearly with the sample size. Thus, KDEs may be difficult to compute in real-time, particularly for constantly growing data streams as the historical data continues to grow.

4.3.1 M-Kernel Implementation

In an embodiment the M-Kernel implementation may be used. The M-Kernel implementation reduces the computation and memory costs by retaining the last m entries, where m is less than n. The M-Kernel is a kernel with mean $X_i^{(n)}$, bandwidth $h_i^{(n)}$, and weights $c_i^{(n)}$. The overall sum of the M-Kernel estimates a KDE after n processed elements:

$$\hat{f}^{(n)}(x) = \frac{m}{n} \sum_{i=1}^{m} \left[\frac{c_i^{(n)}}{h_i^{(n)}} K\left(\frac{x - X_i^{(n)}}{h_i^{(n)}}\right)\right] + \frac{n-m}{n} K\left(\frac{X^*}{h_i^n}\right),$$

such that:

$$\sum_{i=1}^{m} c_i^{(n)} = n.$$

The term X* may be any merge operator, including the historical average or exponentially weighted sum of the elements beyond m elements of the n elements.

For example, if the data points in a stream are 4, 3, 2, 1, where 4 is last number in the stream that was received, m is equal to 3, and $h_i^{(n)}$ is equal to one, then the M-Kernel for the stream is equal to:

$$\frac{3}{4}[K(4) + K(3) + K(2)] + \frac{1}{4}K(1).$$

Furthermore, if the next data point in the stream is 5, then the M-Kernel is equal to:

$$\frac{3}{5}[K(5) + K(4) + K(3)] + \frac{2}{5}K\left[\frac{1}{2}(2) + \frac{1}{2}(1)\right].$$

Further still, if the next data point in the stream is 6, and the term, $$\left[\frac{1}{2}(2) + \frac{1}{2}(1)\right] = 1.5$$

is equal to X*, then:

$$\frac{3}{6}[K(6) + K(5) + K(4)] + \frac{3}{6}K\left[\frac{1}{3}(3) + \frac{2}{3}(1.5)\right].$$

In this example, m plus 3 elements (X*, m, and n) may be required to stay in memory and thus the M-Kernel. Accordingly, the M-Kernel may allow for real-time approximation of a KDE over n elements.

The M-Kernel method, however, makes several statistical assumptions that may not be true in all cases. For example, the M-Kernel method requires $h_i^{(n)}$ to be a constant, which may lead to greater numerical error. Furthermore, typically the normal distribution is used for K, however, there are other kernels that may be used to reduce computation time.

4.3.2 Optimized M-Kernel Implementation

In an embodiment, an optimized of M-Kernel may be used. For example, K may be the Epanechnikov kernel, which may be faster to compute than other kernels since the operators are simple multiplication and addition calculations:

$$K(x) = \frac{3}{4} \cdot (1 - x^2) \cdot (x)_{[-1,1]}$$

Furthermore, to reduce numerical error, $h_i^{(n)}$, which is the bandwidth of both the samples and the M-Kernel, may be:

$$\hat{h}^{(n)} = 1.06 \cdot \hat{\sigma}^{(n)} \cdot n^{-\frac{1}{5}}$$

such that $\hat{\sigma}^{(n)}$ is the estimated standard deviation based, at least in part, on the m samples. Thus, in the optimized embodiment may be:

$$\hat{f}^{(n)}(x) = \frac{1}{n} \sum_{i=1}^{m} \left[ \frac{c_i^{(n)}}{\hat{h}_i^{(n)}} K\left(\frac{x - X_i^{(n)}}{\hat{h}_i^{(n)}}\right) \right] + \frac{n-m}{n} K\left[\frac{X^*}{\hat{h}_i^{(n)}}\right].$$

The optimized M-Kernel function above may further reduce computation costs as well as minimize statistical error.

4.3.3 Modified KDES for Evolving Data

As discussed above, a data stream can vary over time. Accordingly, in an embodiment, the KDE, M-Kernel, or the optimized M-Kernel may be combined with the exponential smoothing function discussed above. For example, the optimized M-Kernel may be modified to incorporate exponential smoothing:

$$\hat{f}_\alpha^{(n)}(x) = \frac{\alpha}{\hat{h}^{(n)}} K\left(\frac{x - X^{(n)}}{\hat{h}^{(n)}}\right) + (1 - \alpha) \hat{f}_\alpha^{(n-1)}(x).$$

Figure 5:
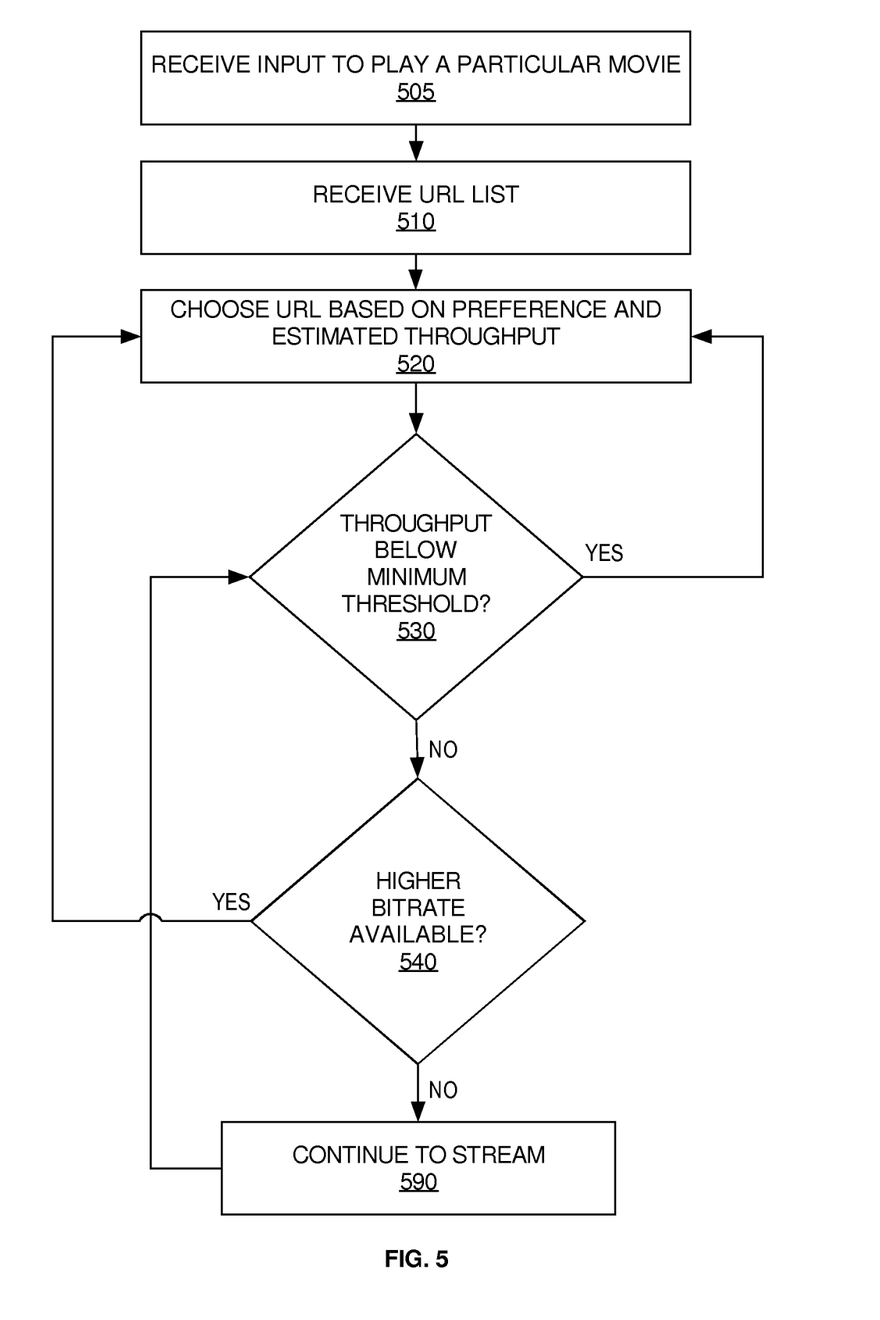
FIG. 5 illustrates an example site-based and estimated throughput-based process to determine which servers to download a bitrate file from, according to one embodiment.

4.4 Overview of Example Site-Based and Estimated Throughput-Based URL Selection Process FIG. 5 illustrates an example site-based and estimated throughput-based process to determine which servers to download a bitrate file from, according to one embodiment. While FIG. 5 illustrates example steps according to an embodiment, other embodiments may omit, add to, reorder, and/or modify any of the steps shown.

For purposes of illustrating a clear example, FIG. 5 may be described using the embodiment illustrated in FIG. 1 for reference. However, other embodiments may be performed using other network arrangements. Referring now to FIG. 5, in step 505, input to play a particular movie is received. For example, client 122 receives input to play a particular movie, as previously discussed in step 205. In step 510, a URL list is received. For example, client 122 receives a URL list, as previously discussed in step 210.

In step 520, a URL is chosen based on a preference and an estimated throughput. For example, client 122 chooses the first URL to download based, at least in part, on 1) the initial bitrate client 122 determines it should attempt to download first, 2) the preference associated with each URL that points to a bitrate file with the desired initial bitrate, and 3) the estimated throughput of each site that each URL points to if available. Client 122 may determine the initial bitrate based any number of factors already discussed in step 220. Additionally, client 122 may also determine the initial bitrate based on the estimated throughput of the sites included in the URL list. After selecting the first URL, client 122 begins downloading the bitrate file from server 136, at site 146, and stores the observed throughput data.

In step 530, the process tests whether throughput is below a minimum threshold. If so, then control transitions back to step 520 and if not, control transitions to step 540. For example, client 122 determines that the throughput received from server 136, at site 146, is above a particular minimum threshold. Accordingly, client 122 proceeds to step 540.

In step 540, the process tests whether a higher bitrate is available; if so, control transitions to step 520 and if not, control transitions to step 590. For example, client 122 attempts to maximize the quality of the user's experience by checking the URL list for the availability of a bitrate file with a higher bitrate. Client 122 determines that a higher bitrate is available on server 134, at site 144, and proceeds to step 520.

In step 520, client 122 selects the URL that points to server 134, at site 144, and client 122 switches to server 134, at site 144. Client 122 stores the observed throughput data from server 134, at site 144, determines an estimated throughput in real-time, and proceeds to revisit step 530. For purposes of this disclosure, determining an estimated throughput in real time means, determining the estimated throughput, using at least the most recently observed throughput data, before receiving the next observed throughput data.

In revisited step 530, client 122 determines that the throughput received from server 134, at site 144, is below a particular minimum threshold. Accordingly, client 122 proceeds to step 520.

In step 520, client 122 switches back to server 136, at site 146. Client 122 resumes downloading the first bitrate file, and stores the observed throughput from server 136, at site 146. Client 122 then proceeds to revisit step 530.

In revisited step 530, client 122 determines that the throughput received from server 136, at site 146, is above a particular minimum threshold. Accordingly, client 122 revisits step 540.

In revisited step 540, client 122 again attempts to maximize the quality of the user's experience by checking the URL list for the availability of a bitrate file with a higher bitrate. Even though client 122 determines that a higher bitrate is available on server 134, at site 144, client 122 correctly estimates that the throughput from site 144 is insufficient to support downloading the higher bitrate in real-time. Accordingly, instead of switching, client 122 proceeds to step 590.

In step 590, streaming data delivery continues. For example, client 122 continues to download the bitrate file from the current URL, as previously described in step 290.

4.5 Servers with Priority-Based Bitrate Files

In order to provide the best quality of experience for a user, a device seeks to download the bitrate file with the highest bitrate available at the time. Storing all bitrate files on all servers has drawbacks. Accordingly, bitrate files may be prioritized such that the most popular bitrate files are stored on more servers, especially high-throughput or low-latency servers. Embodiments can operate effectively with bitrate files that have been selectively placed on particular servers, and minimize poor quality experiences, via clients that maintain site-based historical data, and correctly estimate throughput in real-time using the techniques previously described.

For example, storing historical throughput data at the client may prevent the client from attempting to switch back to the second server to again attempt to download the second bitrate file as previously described in the example above. Techniques to accurately estimate the throughput of the second server may prevent the client from attempting to download the second bitrate from the second server.

4.6 Probing

A client may probe servers or sites in order to collect or update historical data. For example, a client may connect to a server at a site to collect historical data and estimate throughput for the site, for which the client currently has no historical data for. In another example, a client may detect that the client has changed locations in the network topology, and probes servers at sites, which the client already has historical data, in order to update the estimated throughput. A client may choose to probe servers or sites when the client's buffer is full enough to continue to play buffered media in real-time even if the server the client probes has exceptionally poor throughput.

5.0 Implementation Mechanisms—Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
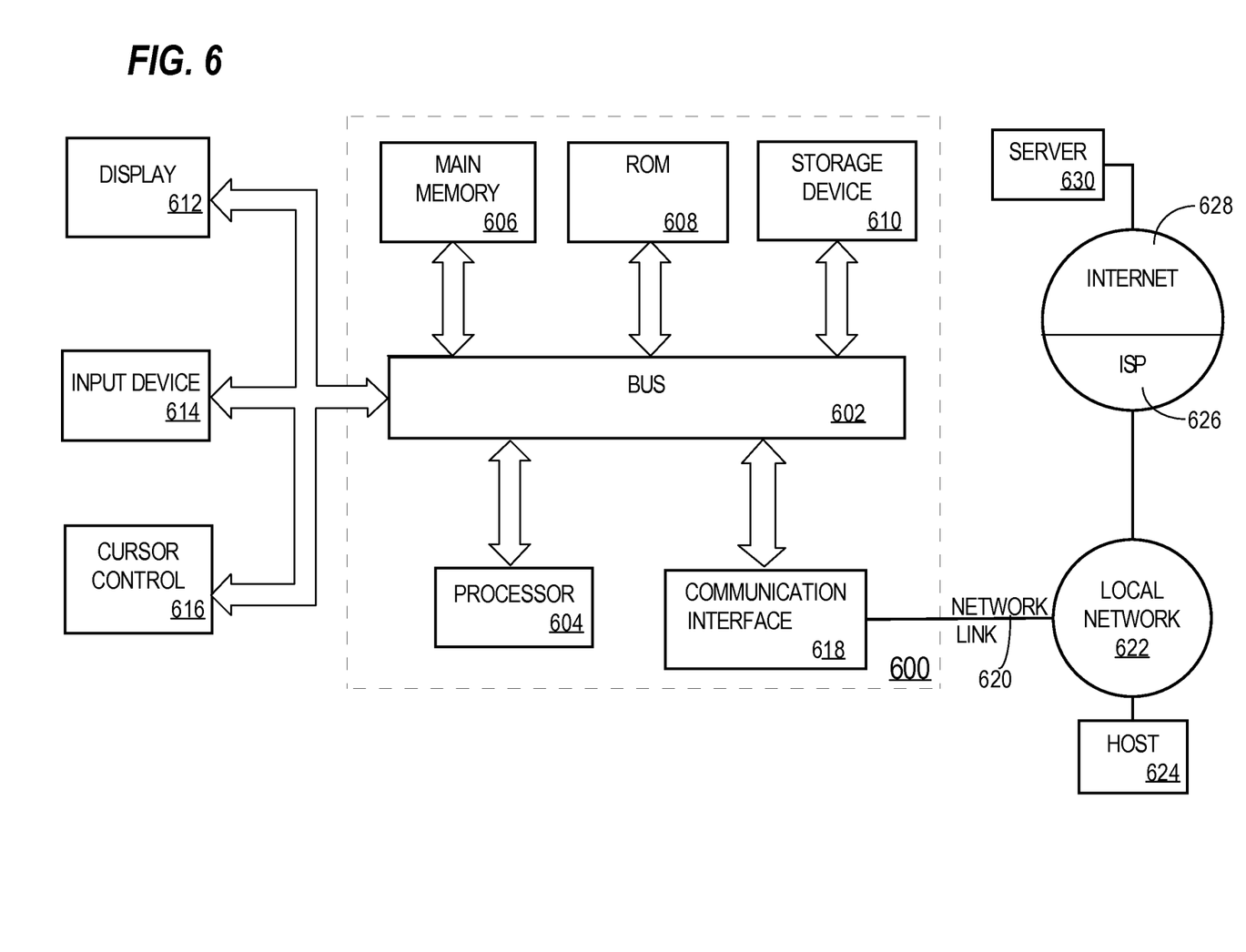
FIG. 6 illustrates a computer system upon which an embodiment may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6.0 Other Aspects of Disclosure

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Aspects of the subject matter described herein are set out in the following numbered clauses:

1. A method comprising: receiving first data that is streamed from a first server computer at a first site having a plurality of server computers; collecting first throughput data for the first site based, at least in part, on a first throughput of the first data that is streamed from the first server computer; receiving second data that is streamed from a second server computer at a second site; collecting second throughput data for the second site based, at least in part, on a second throughput of the second data that is streamed from the second server computer; switching from the second server computer at the second site to a third server computer at the first site, based, at least in part, on a comparison between the first throughput data and the second throughput data; wherein the method is performed by one or more special-purpose computing devices.

2. The method any of clause 1, wherein the first throughput data is collected during a first session, wherein the second throughput data is collected during a second session.

3. The method any of clause 1-2 comprising: computing a first throughput estimate based on the first throughput data in real time; computing a second throughput estimate based on the second throughput data in real time.

4. The method any of clause 1-3 comprising: switching from the third server computer to a fourth server computer at a third site; collecting a third throughput data for the third site; computing a third estimate based on the third throughput data in real-time; wherein throughput data for the third site has not been collected for more than a threshold amount of time.

5. The method any of clause 1-4 comprising: computing a first throughput estimate based on the first throughput data in real-time; computing a second throughput estimate based on the second throughput data in real-time; wherein switching from the second server computer at the second site to the third server computer at the first site is based on the first throughput estimate and the second throughput estimate.

6. The method any of clause 1-5 comprising: computing a first throughput estimate based on the first throughput data in real-time; computing a second throughput estimate based on the second throughput data in real-time; wherein the first throughput estimate and the second throughput estimate are based, at least in part, on a kernel density estimator.

7. The method any of clause 1-6 comprising: computing a first throughput estimate based on the first throughput data in real-time; computing a second throughput estimate based on the second throughput data in real-time; wherein the first throughput estimate and the second throughput estimate are based, at least in part, on a kernel density estimator; wherein the second throughput data is not evolving.

8. The method any of clause 1-7 comprising: computing a first throughput estimate based on the first throughput data in real-time; computing a second throughput estimate based on the second throughput data in real-time; wherein the first throughput estimate and the second throughput estimate are based, at least in part, on a kernel density estimator; wherein the second throughput data is evolving.

9. The method any of clause 1-8 comprising: computing a first throughput estimate based on the first throughput data in real-time; computing a second throughput estimate based on the second throughput data in real-time; determining that a higher bitrate is available on the second server computer at the second site; determining that the second throughput estimate is less than a required throughput in order to play the higher bitrate in real-time.

10. The method any of clause 1-9 comprising: receiving level data; associating the first site to a first level based, at least in part, on the level data; associating the second site to the first level based, at least in part, on the level data; associating a third site to a second level based, at least in part, on the level data; switching from the third server computer at the first site, to a fourth server computer at the third site, if the first site and the second site are no longer available, wherein the first site and the second site are no longer available to receive a third data streamed from any server computer at the first site or the second site.

11. A non-transitory computer-readable data storage medium storing one or more sequences of instructions which when executed cause one or more processors to perform any of the methods recited in clauses 1-10

12. A computer program product including instructions which, when implemented on one or more processors, carries out any of the methods recited in clauses 1-10.

13. A computing device having a processor configured to perform any of the methods recited in clauses 1-10.

What is claimed is:

1. A method comprising:
   selecting, at a client computer, a first bitrate file;
   receiving first data from a first copy of the first bitrate file that is streamed from a first server computer at a first site having a plurality of server computers;
   determining a first throughput estimate for the first site based, at least in part, on a first throughput of the first data from the first copy of the first bitrate file that is streamed from the first server computer;
   associating the first throughput estimate with the first site;
   receiving second data from a second copy of the first bitrate file that is streamed from a second server computer at a second site;
   determining a second throughput estimate for the second site based, at least in part, on a second throughput of the second data from the second copy of the first bitrate file that is streamed from the second server computer;
   associating the second throughput estimate with the second site;
   selecting a second bitrate file, wherein the second bitrate file is different than the first bitrate file;
   determining that a first copy of the second bitrate file is stored at the second server computer at the second site and a second copy of the second bitrate file is stored at a third server computer at the first site, but not the first server computer;
   requesting third data from the first copy of the second bitrate file from the second server computer, without attempting to download data from the second copy of the second bitrate file from the third server computer, based, at least in part, on a comparison between the first throughput estimate associated with the first site and the second throughput estimate associated with the second site;
   wherein the method is performed by one or more special-purpose computing devices.

2. The method of claim 1, wherein the first throughput estimate is determined based on data collected during a first session, wherein the second throughput estimate is determined based on data collected during a second session.

3. The method of claim 1 wherein:
   updating the second throughput estimate based on data from the first copy of the second bitrate file as data from the second server computer is being received in real time.

4. The method of claim 3 comprising:
   determining that data has not been received from a third site for a threshold amount of time, and in response:
   switching from the second server computer to a fourth server computer at the third site;
   computing a third throughput estimate based on data from the fourth server computer as the data from the fourth server computer is being received in real-time.

5. The method of claim 1 comprising:
   determining that the first throughput estimate associated with the first site is lower than the second throughput estimate associated with the second site;
   wherein not switching from the second server computer at the second site to the third server computer at the first site is based on determining that the first throughput is lower than the second throughput estimate.

6. The method of claim 1 comprising:
   determining that the client computer is communicatively coupled to a first computer network;
   determining that the client computer is communicatively coupled to a second computer network, and not the first computer network, and response:
   updating the first throughput estimate based on a third throughput of third data in real-time using an adaptive operator;
   updating the second throughput estimate based on a fourth throughput of fourth data in real-time using the adaptive operator.

7. The method of claim 1 wherein:
   determining the first throughput estimate based on the first throughput of the first data in real-time;
   determining the second throughput estimate based on the second throughput of the first data in real-time;
   the first throughput estimate and the second throughput estimate are based, at least in part, on a kernel density estimator;
   the second throughput estimate is evolving.

8. The method of claim 1 comprising:
   determining that a third bitrate file has a higher bitrate than the second bitrate file;
   determining that a first copy of the third bitrate file is available on a fourth server computer at the first site;
   determining, without attempting to download the first copy of the third bitrate file from the fourth server computer at the first site, that the first throughput estimate is less than a required throughput in order to play the higher bitrate in real-time, and in response, continuing to download the first copy of the second bitrate file from the second server computer at the second site.

9. The method of claim 1 comprising:
   receiving level data;
   associating the first site to a first level based, at least in part, on the level data;
   associating the second site to the first level based, at least in part, on the level data;
   associating a third site to a second level based, at least in part, on the level data;
   switching from the second server computer at the second site, to a fourth server computer at the third site, when the first site and the second site are no longer available to the client computer.

10. The method of claim 1, wherein determining the second throughput estimate is based on an adaptive operator that is an optimized m-kernel density estimator for evolving data.

11. One or more non-transitory computer-readable media storing one or more sequences of instructions which, when executed by one or more computing devices, cause:
   selecting, at a client computer, a first bitrate file;
   receiving first data from a first copy of the first bitrate file that is streamed from a first server computer at a first site having a plurality of server computers;
   determining a first throughput estimate for the first site based, at least in part, on a first throughput of the first data from the first copy of the first bitrate file that is streamed from the first server computer;
   associating the first throughput estimate with the first site;
   receiving second data from a second copy of the first bitrate file that is streamed from a second server computer at a second site;
   determining a second throughput estimate for the second site based, at least in part, on a second throughput of the second data from the second copy of the first bitrate file that is streamed from the second server computer;

associating the second throughput estimate with the second site;

selecting a second bitrate file, wherein the second bitrate file is different than the first bitrate file;

determining that a first copy of the second bitrate file is stored at the second server computer at the second site and a second copy of the second bitrate file is stored at a third server computer at the first site, but not the first server computer;

requesting third data from the first copy of the second bitrate file from the second server computer, without attempting to download data from the second copy of the second bitrate file from the third server computer, based, at least in part, on a comparison between the first throughput estimate associated with the first site and the second throughput estimate associated with the second site.

12. The one or more non-transitory computer-readable media of claim 11, wherein the first throughput estimate is determined based on data collected during a first session, wherein the second throughput estimate is determined based on data collected during a second session.

13. The one or more non-transitory computer-readable media of claim 11 further comprising sequences of instructions which when executed cause:
updating the second throughput estimate based on data from the first copy of the second bitrate file as data from the second server computer is being received in real time.

14. The one or more non-transitory computer-readable media of claim 13 further comprising:
determining that data has not been received from a third site for a threshold amount of time, and in response:
switching from the second server computer to a fourth server computer at the third site;
computing a third throughput estimate based on data from the fourth server computer as the data from the fourth server computer is being received in real-time.

15. The one or more non-transitory computer-readable media of claim 11 further comprising sequences of instructions which when executed cause:
determining that the first throughput estimate associated with the first site is lower than the second throughput estimate associated with the second site;
wherein not switching from the second server computer at the second site to the third server computer at the first site is based on determining that the first throughput is lower than the second throughput estimate.

16. The one or more non-transitory computer-readable media of claim 11 further comprising sequences of instructions which when executed cause:
determining that the client computer is communicatively coupled to a first computer network;
determining that the client computer is communicatively coupled to a second computer network, and not the first computer network, and response:
updating the first throughput estimate based on a third throughput of third data in real-time using an adaptive operator;
updating the second throughput estimate based on a fourth throughput of fourth data in real-time using an optimized m-kernel density estimator for evolving data.

17. The one or more non-transitory computer-readable media of claim 11, wherein:

determining the first throughput estimate based on the first throughput of the first data in real-time;
determining the second throughput estimate based on the second throughput of the first data in real-time;
the first throughput estimate and the second throughput estimate are based, at least in part, on a kernel density estimator;
the second throughput estimate is evolving.

18. The one or more non-transitory computer-readable media of claim 11 further comprising sequences of instructions which when executed cause:
determining that a third bitrate file has a higher bitrate than the second bitrate file;
determining that a first copy of the third bitrate file is available on a fourth server computer at the first site;
determining, without attempting to download the first copy of the third bitrate file from the fourth server computer at the first site, that the first throughput estimate is less than a required throughput in order to play the higher bitrate in real-time, and in response, continuing to download the first copy of the second bitrate file from the second server computer at the second site.

19. The one or more non-transitory computer-readable media of claim 11 further comprising sequences of instructions which when executed cause:
receiving a level data;
associating the first site to a first level based, at least in part, on the level data;
associating the second site to the first level based, at least in part, on the level data;
associating a third site to a second level based, at least in part, on the level data;
switching from the second server computer at the second site, to a fourth server computer at the third site, when the first site and the second site are no longer available to the client computer.

20. The one or more non-transitory computer-readable media of claim 11, wherein determining the second throughput estimate is based on an adaptive operator that is an optimized m-kernel density estimator for evolving data.

21. A client computer for improving experience quality of digitally distributed content and configured to:
receive a first list that enumerates a first plurality of server computers that each host a copy of a first bitrate file;
receive data indicating that a first computer of the first plurality of server computers is associated with a first site;
receive data indicating that a second computer of the first plurality of server computers is associated with a second site;
receive, in response to a first request, a first portion of a first copy of the first bitrate file from the first computer and determine a first throughput;
receive, in response to a second request, a second portion of a second copy of the first bitrate file from the second computer and determine a second throughput;
associate the first throughput with the first site and the second throughput with the second site;
receive a second list that enumerates a second plurality of server computers that each host a copy of a second bitrate file, wherein the second bitrate file is different than the first bitrate file, and the second plurality of server computers includes the second computer and a third computer, but not the first computer;
receive data indicating that the third computer is associated with the first site;

determine, without requesting additional data from the first computer or the third computer, that the second throughput is greater than the first throughput, and in response, send a request to the second computer for data from a first copy of the second bitrate file, without sending a request to the third computer for a portion of a second copy of the second bitrate file.

* * * * *